(12) United States Patent
Mishra et al.

(10) Patent No.: US 12,074,757 B2
(45) Date of Patent: **\*Aug. 27, 2024**

(54) IDENTIFYING NETWORK CONNECTIVITY ISSUES USING TOPOLOGY GRAPHS

(71) Applicant: Cisco Technology, Inc., San Jose, CA (US)

(72) Inventors: Mankamana P. Mishra, San Jose, CA (US); Karthik Babu Harichandra Babu, Chennai (IN); Nitin Kumar, San Jose, CA (US); Manoj K. Pandey, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/820,050

(22) Filed: Aug. 16, 2022

(65) Prior Publication Data
US 2022/0393938 A1 Dec. 8, 2022

Related U.S. Application Data

(63) Continuation of application No. 17/248,547, filed on Jan. 28, 2021, now Pat. No. 11,438,220.

(51) Int. Cl.
| | |
|---|---|
| *H04L 41/0659* | (2022.01) |
| *H04L 41/0677* | (2022.01) |
| *H04L 41/12* | (2022.01) |
| *H04L 43/0811* | (2022.01) |
| *H04L 43/10* | (2022.01) |

(52) U.S. Cl.
CPC ...... *H04L 41/0677* (2013.01); *H04L 41/0659* (2013.01); *H04L 41/12* (2013.01); *H04L 43/0811* (2013.01); *H04L 43/10* (2013.01)

(58) Field of Classification Search
CPC . H04L 41/0659; H04L 41/0677; H04L 41/12; H04L 41/0672; H04L 43/0811; H04L 43/10; H04L 12/189; H04L 45/123; H04L 45/26; H04L 41/145; H04L 43/06
See application file for complete search history.

(56) References Cited

U.S. PATENT DOCUMENTS

| | | | | |
|---|---|---|---|---|
| 2008/0019363 | A1* | 1/2008 | Kitajima | H04L 45/26 370/391 |
| 2008/0089333 | A1* | 4/2008 | Kozat | H04L 45/123 370/390 |
| 2009/0113508 | A1* | 4/2009 | Foti | H04L 12/189 725/118 |
| 2010/0208595 | A1* | 8/2010 | Zhao | H04L 41/0672 370/242 |

(Continued)

*Primary Examiner* — Le H Luu
(74) *Attorney, Agent, or Firm* — Patterson + Sheridan, LLP (57) ABSTRACT

Techniques for connectivity issue remediation are provided. A first link trace message is transmitted from a source end point to a destination end point. A first topology graph for a network is generated based on the first link trace message, and a presence of a connectivity issue in the network is detected. A second link trace message is transmitted from the source end point to the destination end point. A second topology graph for the network is automatically generated based on second link trace message, and a component in the network that caused the connectivity issue is identified based on comparing the first and second topology graphs.

20 Claims, 9 Drawing Sheets

(56) References Cited

U.S. PATENT DOCUMENTS

| | | | |
|---|---|---|---|
| 2012/0287795 A1* | 11/2012 | Mohan | H04L 43/10 370/242 |
| 2014/0369177 A1* | 12/2014 | Keesara | H04L 43/0811 370/216 |
| 2022/0200868 A1* | 6/2022 | Sobhani | H04L 41/145 |
| 2022/0224590 A1* | 7/2022 | Tiwari | H04L 43/06 |

* cited by examiner

IDENTIFYING NETWORK CONNECTIVITY ISSUES USING TOPOLOGY GRAPHS

CROSS-REFERENCE TO RELATED APPLICATIONS

This application is a continuation of co-pending U.S. patent application Ser. No. 17/248,547 filed Jan. 28, 2021. The aforementioned related patent application is herein incorporated by reference in its entirety.

TECHNICAL FIELD

Embodiments presented in this disclosure generally relate to network links. More specifically, embodiments disclosed herein relate to using topology graphs to automatically identify loops and other connectivity issues.

BACKGROUND

In network deployments, network loops can cause a wide variety of disruptions by consuming bandwidth, causing traffic drops, disabling communication between end points, and degrading application performance. These loops may be introduced accidentally in a number of ways, such as during migration (e.g., from a legacy Ethernet-based Layer 2 deployment to a virtual extensible local area network (VXLAN) deployment). Additionally, network operators may mistakenly create loops when adding links or by misconfiguring a node. Such network links significantly degrade the operability of the network, but existing systems require users to manually identify and remediate the redundant link(s) with little or no direction. Particularly in larger deployments, this delay introduced by a slow and manual review causes undue disruption.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

According to one embodiment of the present disclosure, a method is provided. The method includes: transmitting, from a source end point to a destination end point, a first link trace message; generating a first topology graph for a network based on the first link trace message; detecting a presence of a connectivity issue in the network; transmitting, from the source end point to the destination end point, a second link trace message; automatically generating a second topology graph for the network based on second link trace message; and identifying a component in the network that caused the connectivity issue based on comparing the first and second topology graphs.

According to one embodiment of the present disclosure, one or more computer-readable storage media are provided. The one or more computer-readable storage media collectively contain computer program code that, when executed by operation of one or more computer processors, performs an operation. The operation includes: transmitting, from a source end point to a destination end point, a first link trace message; generating a first topology graph for a network based on the first link trace message; detecting a presence of a connectivity issue in the network; transmitting, from the source end point to the destination end point, a second link trace message; automatically generating a second topology graph for the network based on second link trace message; and identifying a component in the network that caused the connectivity issue based on comparing the first and second topology graphs.

According to one embodiment of the present disclosure, a system is provided. The system includes one or more computer processors, and one or more memories collectively containing one or more programs which when executed by the one or more computer processors performs an operation. The operation includes: transmitting, from a source end point to a destination end point, a first link trace message; generating a first topology graph for a network based on the first link trace message; detecting a presence of a connectivity issue in the network; transmitting, from the source end point to the destination end point, a second link trace message; automatically generating a second topology graph for the network based on second link trace message; and identifying a component in the network that caused the connectivity issue based on comparing the first and second topology graphs.

Example Embodiments

Embodiments of the present disclosure provide techniques to automatically identify and, in some embodiments, remediate network connectivity issues using topology graphs. In some embodiments, topology graphs are created based on network trace messages at various points in time. Such topology graphs can then be compared to rapidly identify changes over time. This enables the system to automatically identify problematic links or nodes in a rapid and scalable way.

In some embodiments, links can be introduced during migration from legacy deployments (e.g., Ethernet-based deployments) to VXLAN deployments. For example, during such migrations, the legacy deployment may be gradually and smoothly replaced by a VXLAN overlay. During this migration, the physical Layer 2 network must coexist with the VXLAN overlay Layer 2 network for some period of time. In an embodiment, the Layer 2 VXLAN overlay initially spans across the legacy Ethernet-based Layer 2 network using one or more virtual local area networks (VLANs). Although some solutions exist to prevent loops in Ethernet-based networks, such solutions are not available in VXLAN overlays due to a variety of hardware limitations. Nevertheless, care must be taken during the migration to avoid introduction of loops. Embodiments of the present disclosure provide techniques to automatically detect and prevent such loops from degrading network performance.

In some embodiments of the present disclosure, techniques are provided not only to automatically detect the presence of a loop or other problematic node or link, but also to pinpoint the particular link(s) and/or node(s) that introduced the issue. In an embodiment, the system does so by building topology graphs to act as snapshots in time. These graphs allow the system to automatically identify concerns, without forcing network operators to manually review and identify the problematic nodes or links.

In embodiments, the techniques described herein can significantly reduce the disruption caused by network loops, and drastically improve the overall performance of the network. In some embodiments, when a loop is introduced, it may include a large number of individual links, and while a single new link may have caused the disruption, the ramifications of the introduced loop may be detected elsewhere in the network. For example, if a Layer 2 loop is introduced between a first and second endpoint, duplicate-detection errors may occur at remote endpoints as well. Without knowing the precise link(s) that introduced the loop, the loop may be detected and reported by a number of endpoints, causing confusion and disruption. Embodiments of the present disclosure can pinpoint the problematic links and prevent such issues.

Additionally, when loops occur and are detected by multiple endpoints, the individual endpoints may each attempt to mitigate the loop (such as by blocking the VLAN on the problematic port, or bringing down the port entirely). This can cause hosts that are attached by the loop to quickly go from having multiple paths (some due to the loop) to having no paths at all between them (as multiple endpoints attempt to remediate the loop effectively simultaneously). Embodiments of the present disclosure can pinpoint the problematic links and prevent such issues.

Further, loops may cause incorrect host learning. When a loop occurs, endpoints that are part of the loop may incorrectly learn hosts that do not belong in the loop. For example, if a physical port on a first endpoint is connected to a port on a second endpoint, and both ports share the same VLAN, then broadcast messages from a remote endpoint can reach the first endpoint and subsequently, via the loop, reach the second endpoint. This causes the second endpoint to incorrectly learn the host (which is actually behind the remote endpoint) location. Similarly, broadcast messages from the remote endpoint may also reach the second endpoint and then, via the same loop, reach the first endpoint. This likewise causes the first endpoint to incorrectly learn the host location. Once the loop is detected, the local learnings at the first and second endpoints must be cleared to correct this incorrect assumption. However, without having a global graph structure, either endpoint may identify the loop while the other does not. Only the endpoint that detects the loop will clear its learning, while the other may continue to advertise the incorrect learning. This can lead to hoses pointing incorrectly after the loop is cleared. Embodiments of the present disclosure can prevent these concerns using network topology graphs.

Figure 1:
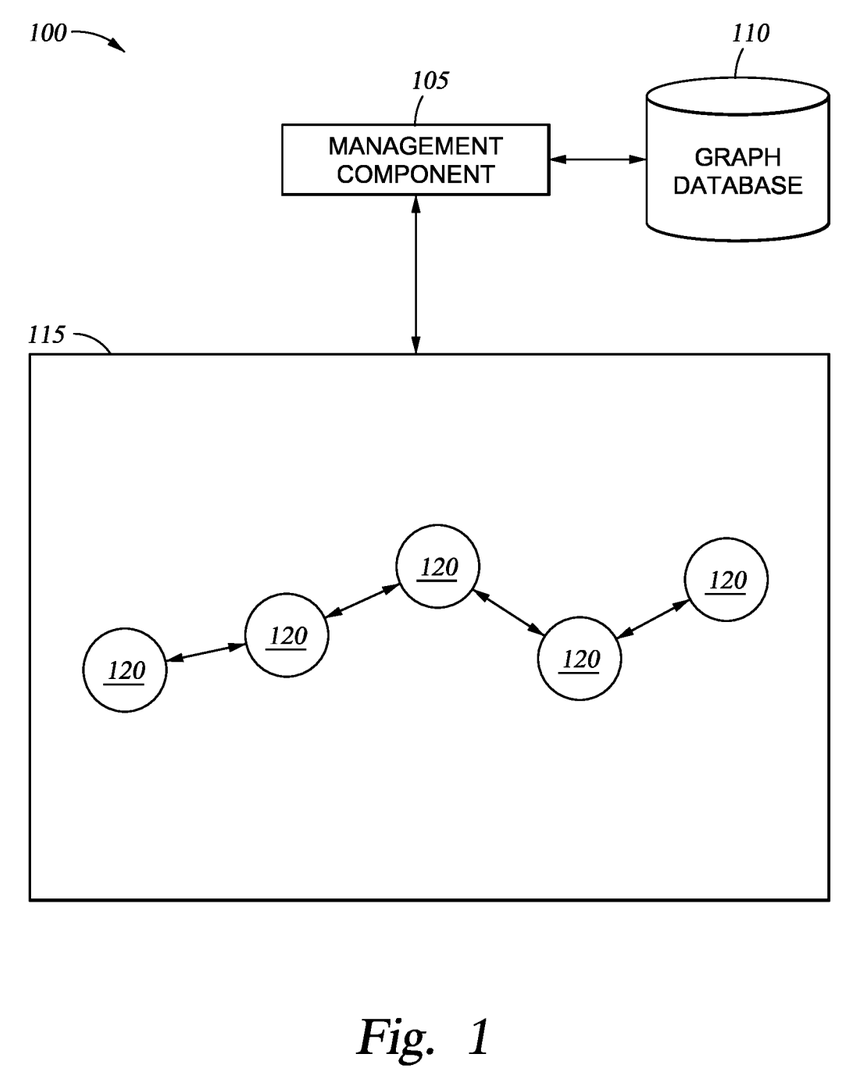
FIG. 1 depicts an environment including a management component configured to automatically identify problematic links or nodes based on topology graphs, according to some embodiments disclosed herein.

FIG. 1 depicts an environment 100 including a Management Component 105 configured to automatically identify problematic links or nodes based on topology graphs, according to some embodiments disclosed herein. In the illustrated embodiment, the Management Component 105 is communicatively coupled with one or more Nodes 120 in a Network 115. The Nodes 120 may be interconnected using any number of links. In the illustrated embodiment, the Management Component 105 is also coupled with a Graph Database 110.

In an embodiment, the Management Component 105 can generate topology graphs (e.g., based on link trace messages) for the Network 115, and store these graphs in the Graph Database 110. By comparing topology graphs generated at different times, the Management Component 105 can automatically identify new link(s) or node(s) which are causing connectivity issues.

In embodiments, the Management Component 105 provides a framework for automatic loop detection (such as based on triggering events). In some embodiments, the Management Component 105 also provides automatic remediation of such loops. In at least one embodiment, the Management Component 105 can determine or identify specific point(s) in the Network 115 (e.g., the particular Node 120 and/or interface on the Node 120) that is causing the loop. In some embodiments, in addition to loop detection, the Management Component 105 framework can also help identify other network changes, such as intermediate/end devices being down or packet path changes.

In some embodiments, if a deployment already has loop-detection capabilities, the Management Component 105 can be used as an input trigger to start the loop detection mechanism and, upon loop detection, the Management Component 105 can improve the existing implementation by performing the correct mitigation.

In embodiments, the Management Component 105 can provide automated issue detection and remediation using a link trace message (LTE) periodic trigger to the remote endpoints. The triggered sequence of path traversal of the LTM can then be used to generate and store a network topology graph, which existing solutions do not provide.

In an embodiment, the Management Component 105 can automatically trigger LTMs based on a variety of triggering events, such as the detection of a loop in the Network 115, detection of a routing change in the Network 115, detection of an interface on one or more Nodes 120 going up or coming down, as well as periodic probes (e.g., using a user-configured interval).

In some embodiments, once the Management Component 105 has built a topology graph based on the LTM path traversal, a variety of algorithms can be applied to detect presence of loops. For example, techniques for finding loops in undirected graphs using depth-first-search, breadth-first-search, and/or union-find can be used. In embodiments, these solutions can typically run in linear time based on the total number of Nodes 120 that are in the graph.

In an embodiment, once the Management Component 105 determines that the newest topology graph has a loop, the Management Component 105 can compare the new graph with a prior graph snapshot that did not have a loop (e.g., the immediately prior graph). Based on this comparison, the Management Component 105 can rapidly identify the difference(s) between the graphs, which correspond to any new edge(s) (e.g., new links in the Network 115) that were added and thereby caused the loop. This enables the Management Component 105 to rapidly identify the particular problematic node(s) or link(s), and automatically remediate the issue to remove the loop.

Figure 2A:
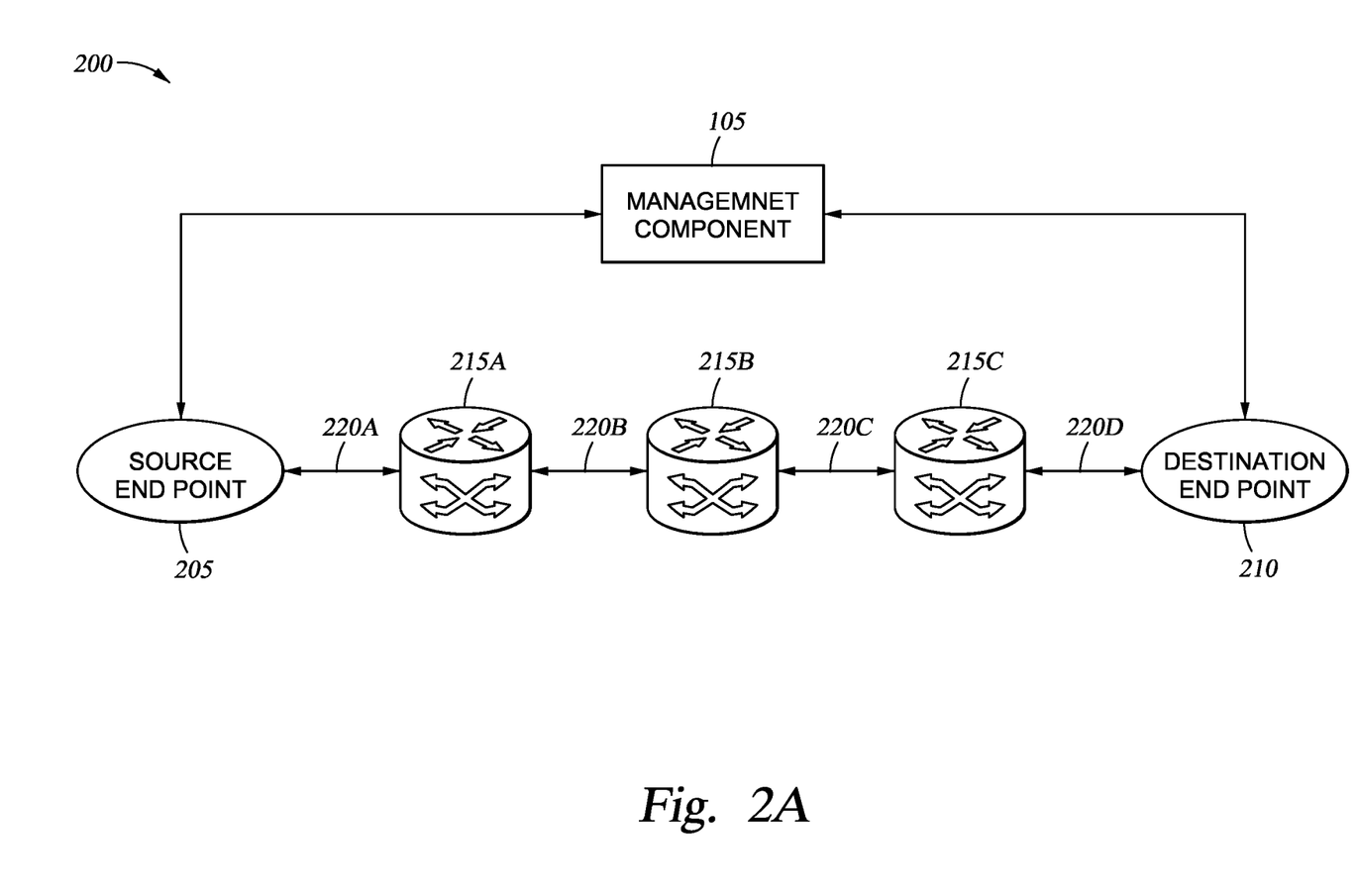
FIGS. 2A-2C depict a network topology at various points in time, where a management component automatically identifies and disables a redundant link to remedy connectivity issues, according to some embodiments disclosed herein.
Figure 2B:
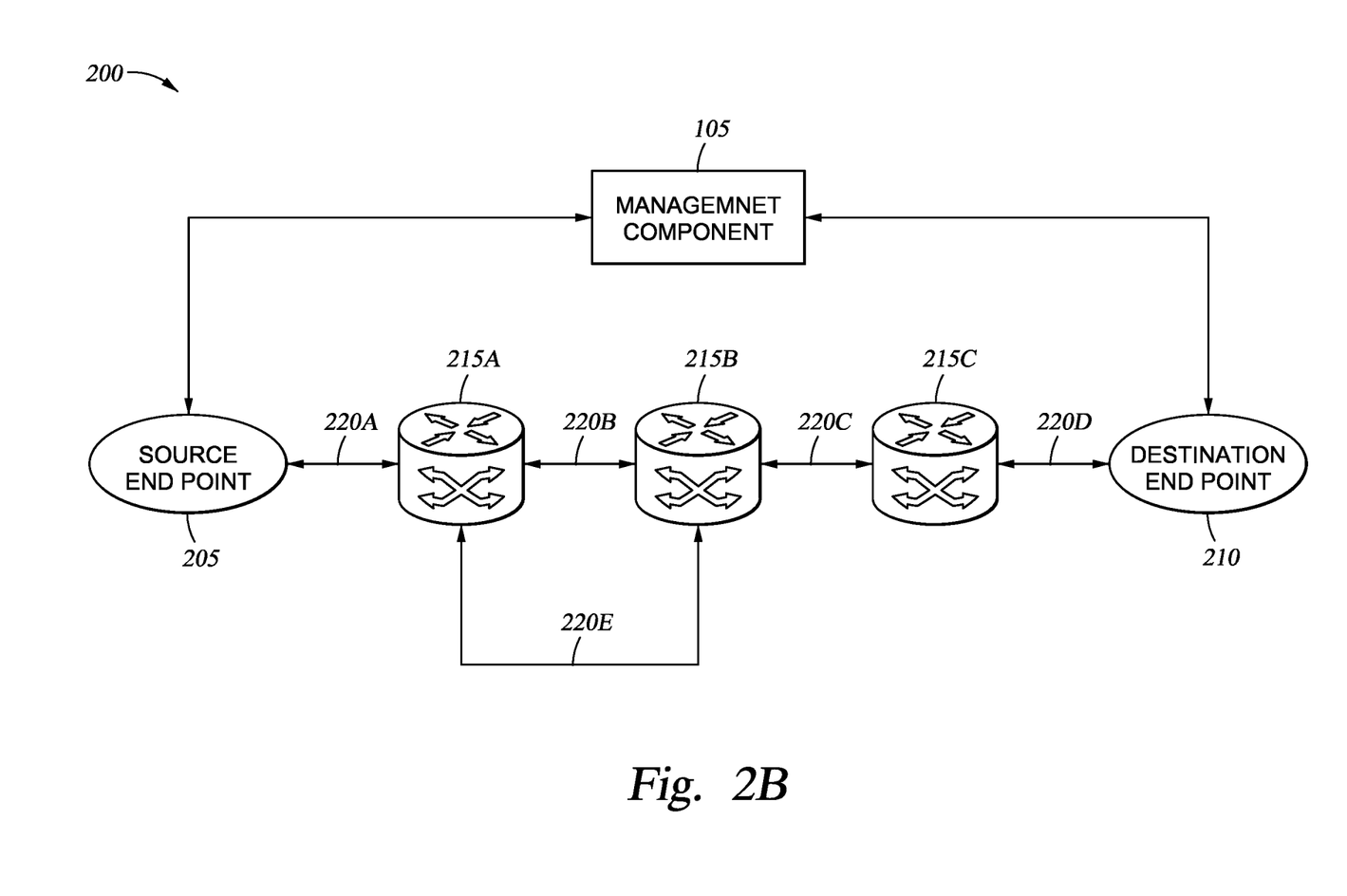
Figure 2C:
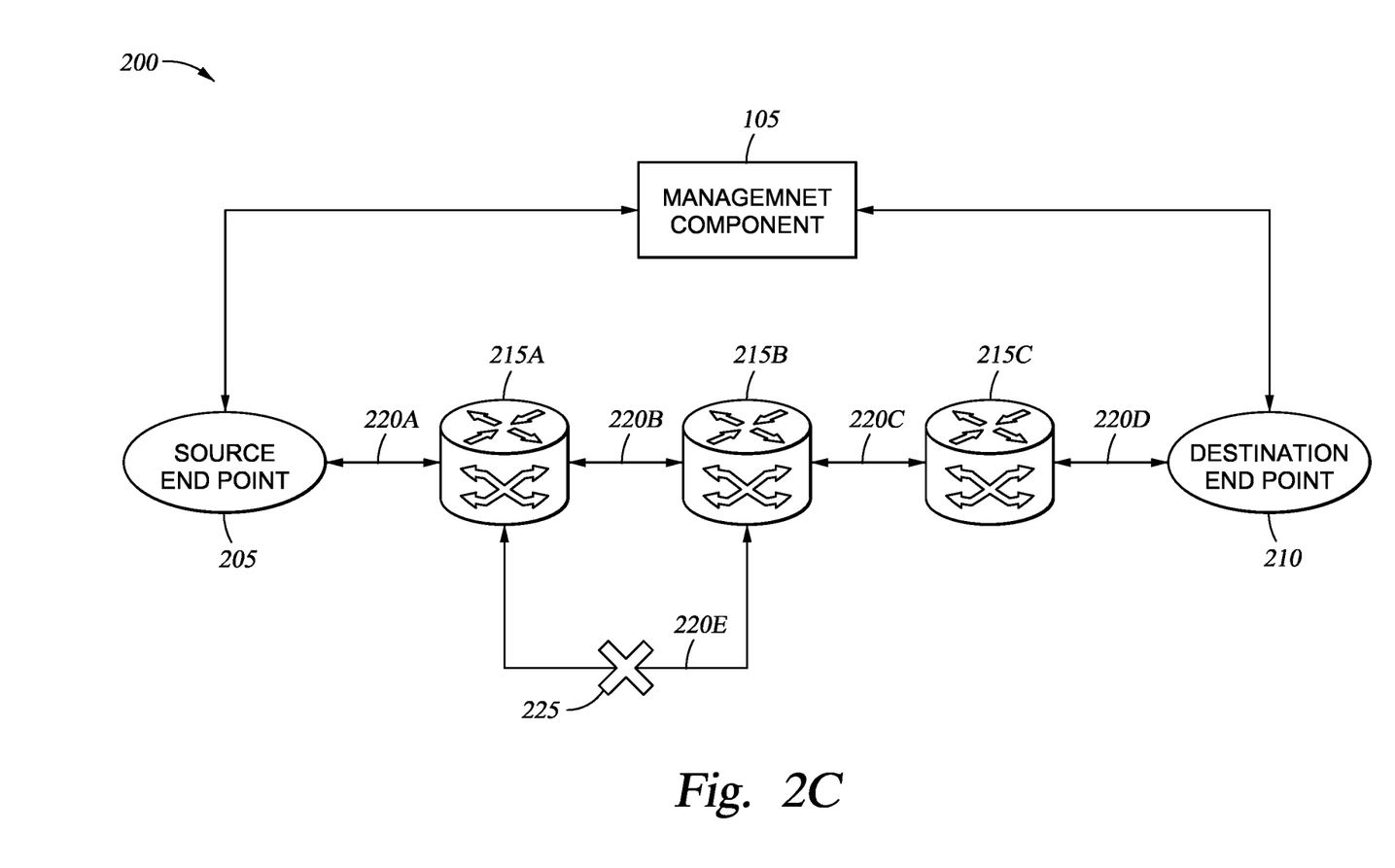

FIGS. 2A-2C depict a network topology 200 at various points in time, where a management component (e.g., Management Component 105) automatically identifies and disables a redundant link to remedy connectivity issues, according to some embodiments disclosed herein. In the illustrated embodiment of FIG. 2A, the network includes a set of Nodes 215A-C, with Links 220A-D. In an embodiment, the Management Component 105 can use a Source End Point 205 and Destination End Point 210 to generate the topology graph.

In embodiments, the Source End Point 205 and Destination End Point 210 may be selected using any suitable criteria. In at least one embodiment, the Source End Point 205 and Destination End Point 210 are defined or selected based on maintenance or service domains (e.g., defined by operational or contractual boundaries). For example, the Source End Point 205 and Destination End Point 210 may correspond to the boundaries of a sub-section of a network that is controlled or managed by a given entity. In some embodiments, there may be any number of Source End Points 205 and Destination End Points 210 at various points in the network, depending on the particular implementation. In some embodiments, each Source End Point 205 and Destination End Point 210 are associated with a respective Management Component 105. In another embodiment, the Management Component 105 can select the particular Source End Point 205 and Destination End Point 210 of interest.

In an embodiment, the Management Component 105 can build a topology graph for the network by instructing the Source End Point 205 to transmit a LTM to the Destination End Point 210. In the illustrated embodiment, this LTM will traverse Link 220A to the Node 215A, followed by Link 220B to the Node 215B, followed by Link 220C to the Node 215C, and finally Link 220D to the Destination End Point 210. Based on this LTM, the Management Component 105 can then build a topology graph indicating the relevant Node(s) 215, as well as the available Link(s) 220 between each node.

In FIG. 2B, an additional Link 220E has been added to the network. This Link 220E may be added for a variety of reasons, such as manually (e.g., in an attempt to improve throughput or connectivity), automatically (e.g., during a migration procedure), and the like. As illustrated, this new Link 220E has introduced a loop in the network. That is, packets transmitted from the Source End Point 205 towards the Destination End Point 210 may leave the Node 215A via either the Link 220B or the Link 220E. They may similarly return from the Node 215B back to the Node 215A via the other link. In this way, the Link 220E has introduced a loop.

In one embodiment, the Management Component 105 can initiate another trace by instructing the Source End Point 205 to transmit a LTM to the Destination End Point 210. In various embodiments, this LTM may be triggered according to any number of criteria. For example, the Management Component 105 may initiate the LTM based on determining that a predefined period of time has elapsed since the last trace. Similarly, the Management Component 105 may initiate the LTM based on determining that one or more changes were made in the network (e.g., a new link was added, one or more interfaces or ports on the Nodes 215A or 215B were reconfigured, and the like), based on determining that a loop has been introduced, and the like.

In an embodiment, upon generating the new topology graph, the Management Component 105 can compare it to a previous topology graph that does not include the loop. By finding the difference between the graphs, the Management Component 105 can rapidly identify the Link 220E as the problematic element that has caused the new loop.

FIG. 2C depicts the network after the Management Component 105 has initiated remediating or mitigating actions to remedy the loop. Specifically, as indicated by the Cross 225, the Management Component 105 has disabled the Link 220E in order to remove the loop. This may include, for example, instructing the Node 215A and/or Node 215B to close the port or interface to which the Link 220E is connected.

In at least one embodiment, the Management Component 105 can also generate an alert, allowing network operators to review information about the loop. For example, the alert may indicate the time the loop was created and/or detected, the location of the problematic link(s) or node(s), the action(s) that were taken to remedy the loop, and the like.

Figure 3A:
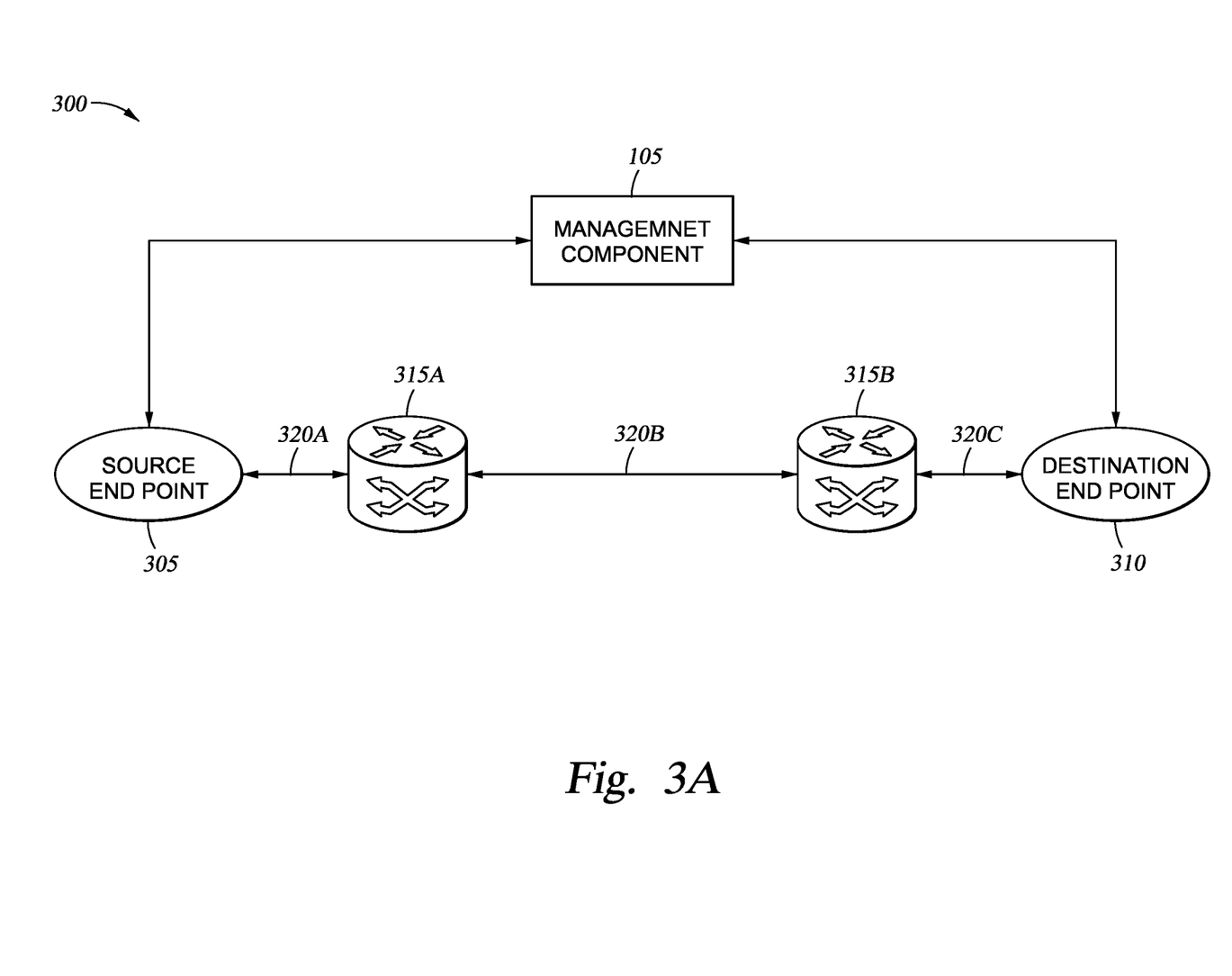
FIGS. 3A-3B depict a network topology at various points in time, where a management component automatically identifies and remediates an incomplete or offline link to remedy connectivity issues, according to some embodiments disclosed herein.
Figure 3B:
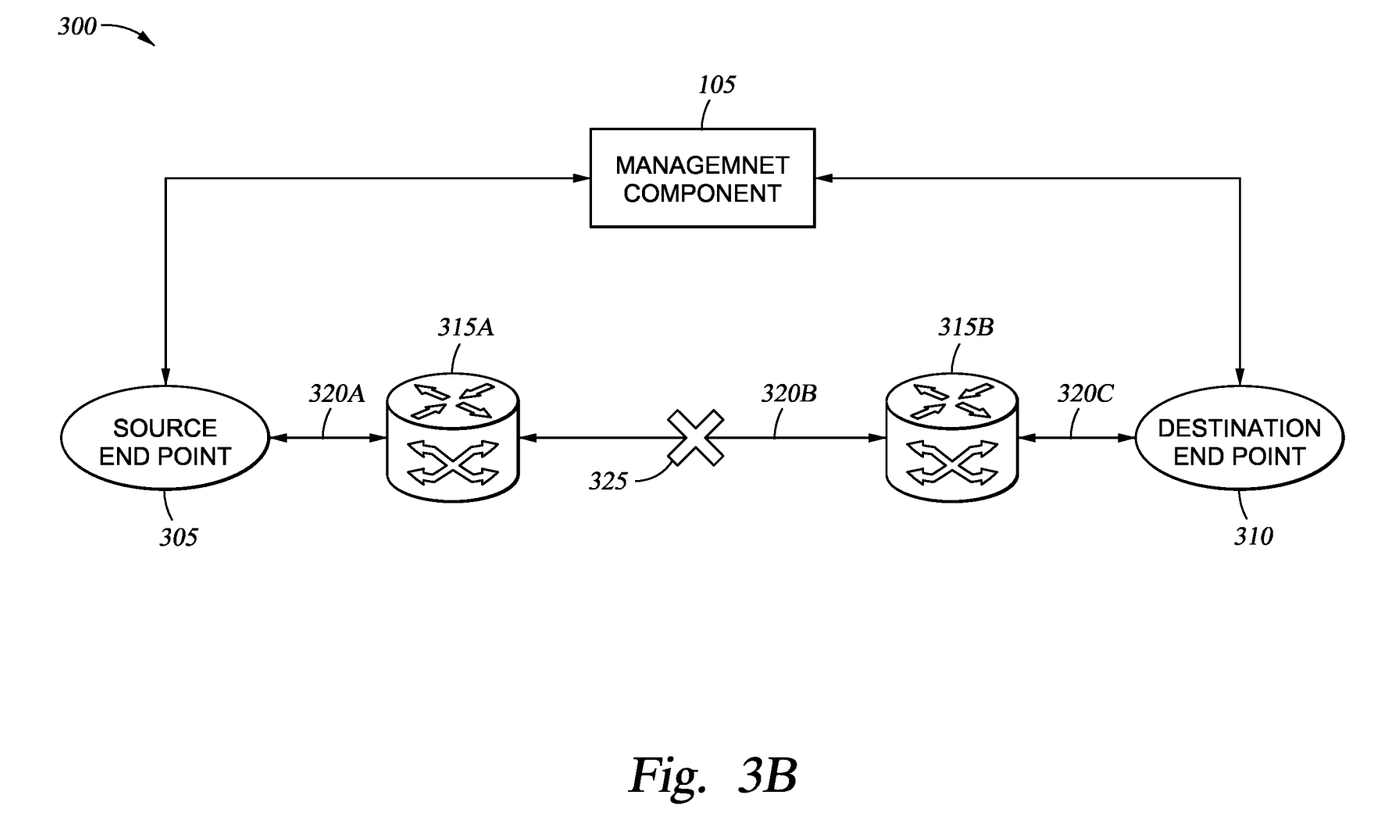

FIGS. 3A-3B depict a network topology at various points in time, where a management component automatically identifies and remediates an incomplete or offline link to remedy connectivity issues, according to some embodiments disclosed herein. In the illustrated embodiment of FIG. 3A, the network includes a set of Nodes 315A-B with Links 320A-C. In an embodiment, the Management Component 105 can use a Source End Point 305 and Destination End Point 310 to generate the topology graph.

In embodiments, as discussed above, the Source End Point 305 and Destination End Point 310 may be selected using any suitable criteria. In an embodiment, the Management Component 105 can build a topology graph for the network by instructing the Source End Point 305 to transmit a LTM to the Destination End Point 310. The graph generation may be triggered using any suitable criteria, as discussed above.

FIG. 3B depicts the network 300 after the Link 320B has failed. This failure may be caused by any number of issues, such as failure of a physical link, a port or interface going down, a node failing, and the like. In some embodiments, this failure acts as a trigger to initiate a new LTM so the Management Component 105 can generate a new topology graph. In other embodiments, the Management Component 105 may generate a new graph based on other triggers, such as a predefined elapsed time.

In the illustrated embodiment, the Management Component 105 can identify, based on the new graph, that a connectivity issue is present. In some embodiments, by comparing the current graph to a previous one, the Management Component 105 can further identify the particular Link 320B and/or Node 315A or 315B that has caused the connectivity break. In an embodiment, the Management Component 105 may proceed to remediate the issue (such as by reconfiguring one or more nodes or interfaces) if possible. In some embodiments, the Management Component 105 can additionally or alternatively generate an alert indicating the particular point of failure.

Figure 4:
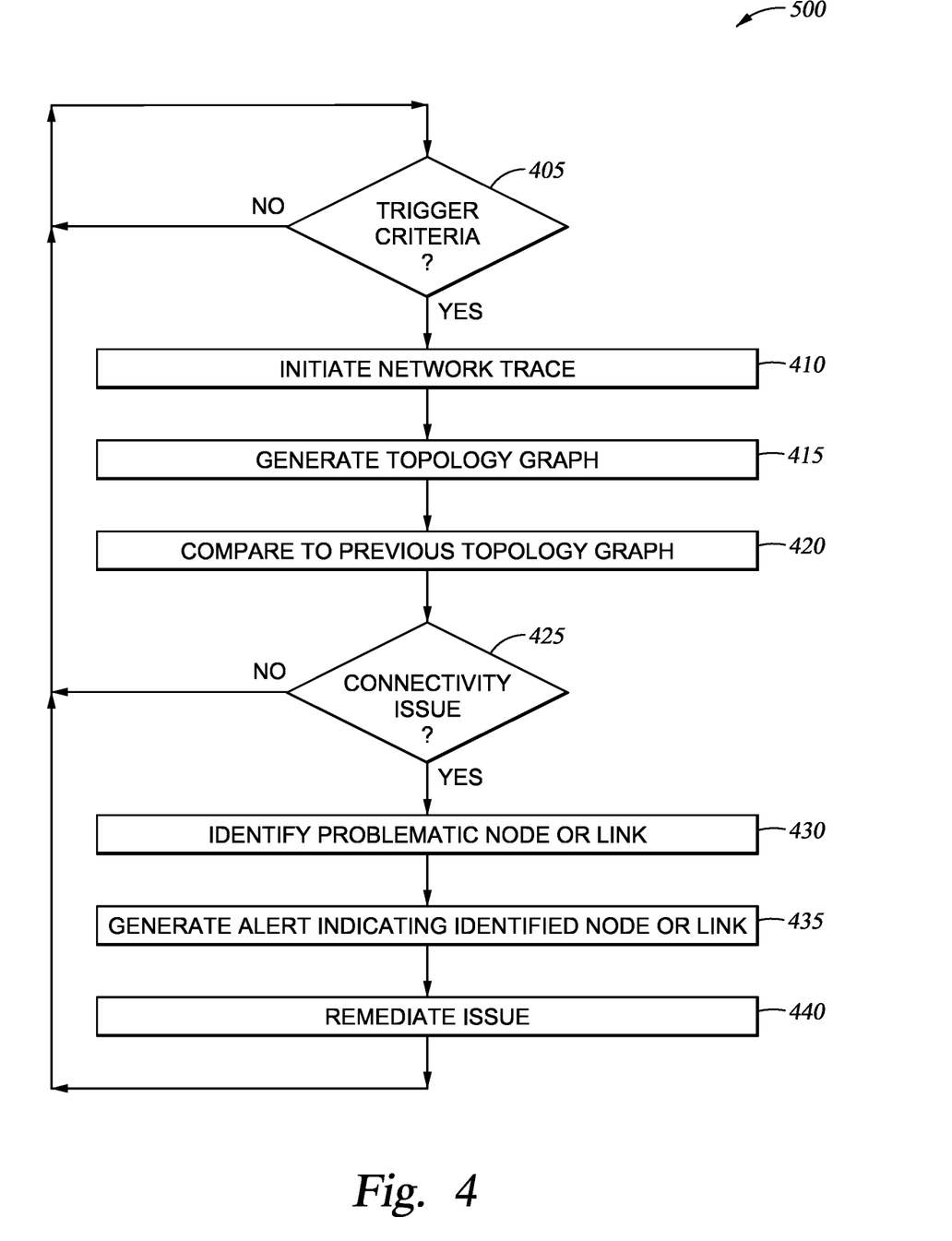
FIG. 4 is a flow diagram illustrating a method for automatically identifying and remediating network issues using topology graphs, according to some embodiments disclosed herein.

FIG. 4 is a flow diagram illustrating a method 400 for automatically identifying and remediating network issues using topology graphs, according to some embodiments disclosed herein. The method 400 begins at block 405 where a management component (e.g., the Management Component 105) determines whether one or more trace trigger criteria are satisfied. In some embodiments, as discussed above, this trigger criteria can include a predefined elapsed time, detection of a loop in the network, detection of a routing change in the network, detection of an interface coming up or going down, and the like.

In some embodiments, the trigger criteria are evaluated based on continuity packets (e.g., using a continuity check protocol (CCP)). For example, the source end point may periodically transmit continuity check packets towards one or more destination end points. The management component may determine whether the criteria are satisfied based in part on whether these continuity packets are successful (e.g., whether they arrive at the destination or not, whether they encounter a loop, and the like).

If the trigger criteria are not satisfied, the method 400 iterates at block 405. If one or more of the trigger criteria are met, however, the method 400 continues to block 410. At block 410, the management component initiates a network trace. This may include, for example, instructing one or more source end points to transmit one or more LTMs to one or more destination end points. In one embodiment, an LTM is a multicast frame that is used to track the network path (hop-by-hop) from the source end point to the destination end point.

At block 415, based on the network path revealed by the LTM, the management component can generate a topology graph for the network. In an embodiment, each node in the topology graph corresponds to a node in the network between the source and destination end points, and each (undirected) edge in the graph corresponds to a link in the network. The method 400 then continues to block 420.

At block 420, the management component compares the currently-generated topology graph to one or more prior topology graphs in order to determine if there are any differences between them. These differences may include one or more new links in the graph that were not present in the prior graph, one or more links in the prior graph which are not present in the new graph, one or more new nodes in the new graph which were not present in the prior graph, as well as one or more nodes in the prior graph which are not present I the new graph.

In at least one embodiment, at any point in time, the graph database maintains an entry as the current network path traversal. In one such embodiment, if the management component determines that there is no difference between the newly-generated graph and the most recent graph stored in the database, the management component may refrain from updating the database. In contrast, if at least one difference is present, the management component may update the database by storing the newly-generated graph as the current topology graph for the network.

The method 400 then continues to block 425, where the management component determines whether there is a connectivity issue in the network. This may include, for example, determining whether the newly-generated graph includes one or more loops or disconnects. In some embodiments, the management component makes this determination based on the trigger criteria. For example, if the new graph was triggered based on identification of a loop or other connectivity issue, the management component may determine, at block 425, that such an issue is present.

If no connectivity issues are identified, the method 400 returns to block 405. If at least one connectivity issue is identified, however, the method 400 continues to block 430. At block 430, the management component identifies the problematic node(s) and/or link(s) by evaluating the new topology graph. In some embodiments, the management component identifies the problematic elements by comparing the new graph to the immediately-prior graph. This allows the management component to identify all elements that have changed (e.g., all new or missing nodes and links), which allows the management component to rapidly identify which element(s) caused the connectivity issues.

The method 400 then continues to block 435, where the management component generates an alert indicating the identified node(s) and/or link(s) that caused the problems. In some embodiments, this alert can be provided to network operators. Further, at block 440, the management component can remediate the issue automatically in some embodiments (such as by removing the problematic link, disabling one or more interfaces, and the like). The method 400 then returns to block 405.

Figure 5:
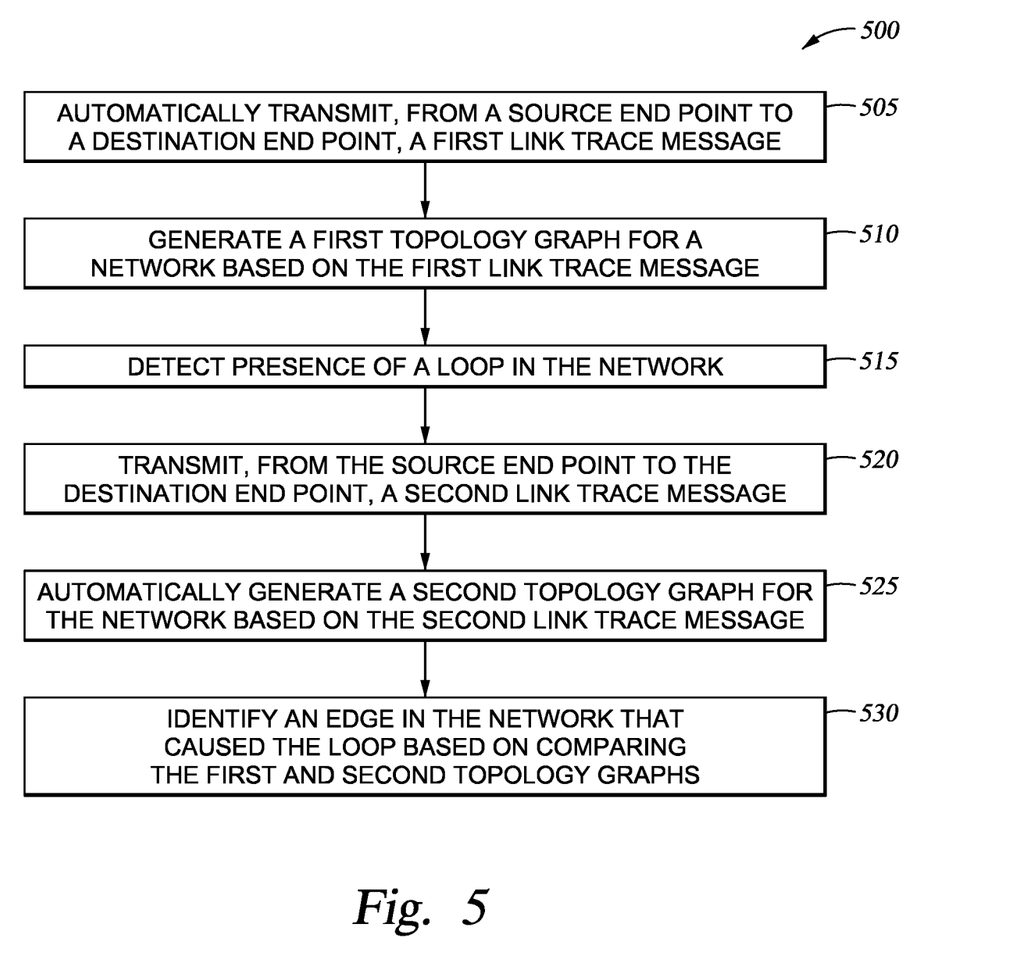
FIG. 5 is a flow diagram illustrating a method for automatically identifying network loops using topology graphs, according to some embodiments disclosed herein.

FIG. 5 is a flow diagram illustrating a method 500 for automatically identifying network loops using topology graphs, according to some embodiments disclosed herein. The method 500 begins at block 505, where a management component (e.g., the Management Component 105) automatically transmits, from a source end point to a destination end point, a first link trace message. At block 510, the management component generates a first topology graph for a network based on the first link trace message. Further, at block 515, where the management component detects presence of a loop in the network. At block 520, the management component transmits, from the source end point to the destination end point, a second link trace message. The method 500 then proceeds to block 525, where the management component automatically generates a second topology graph for the network based on the second link trace message. At block 530, the management component identifies an edge in the network that caused the loop based on comparing the first and second topology graphs.

Figure 6:
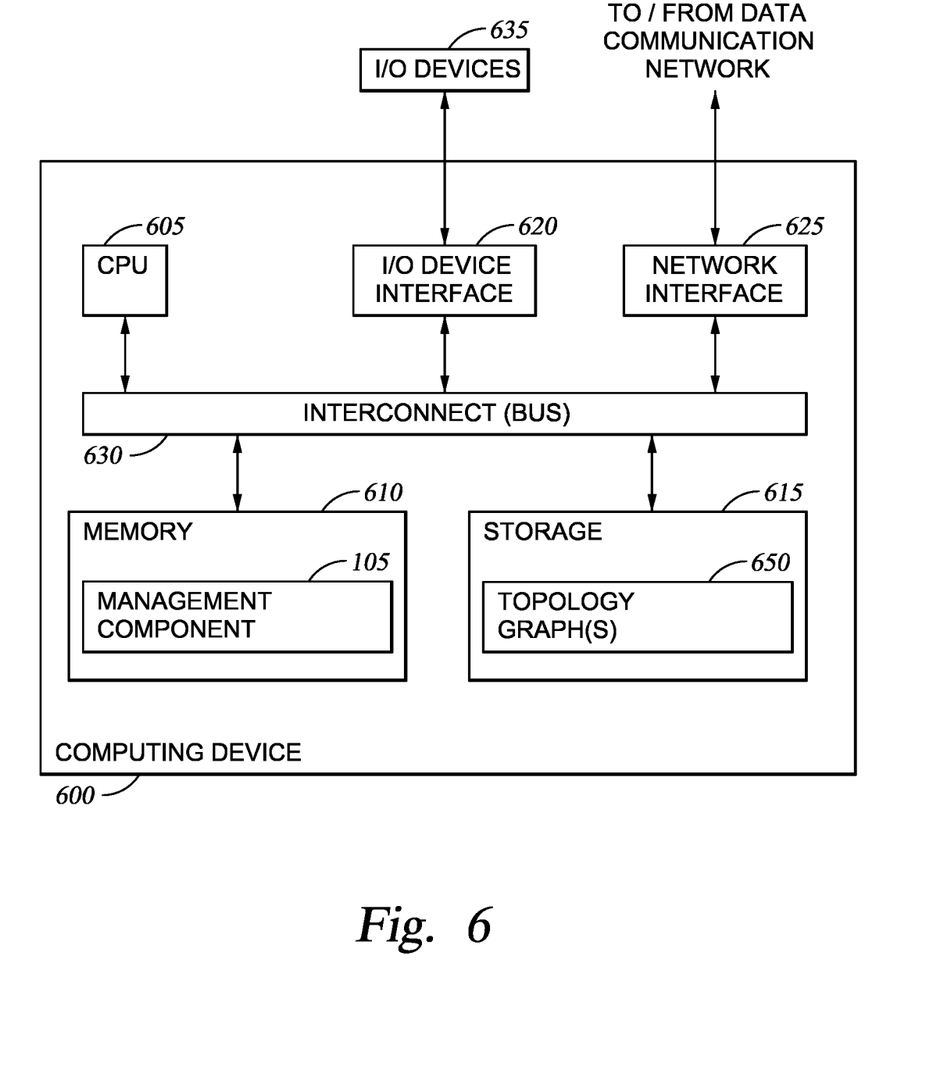
FIG. 6 is a block diagram of a computing device configured to automatically identify and remediate network issues using topology graphs, according to some embodiments disclosed herein.

FIG. 6 is a block diagram of a Computing Device 600 configured to automatically identify and remediate network issues using topology graphs, according to some embodiments disclosed herein. Although depicted as a physical device, in embodiments, the Computing Device 600 may be implemented using virtual device(s), and/or across a number of devices (e.g., in a cloud environment). As illustrated, the Computing Device 600 includes a CPU 605, Memory 610, Storage 615, a Network Interface 625, and one or more I/O Interfaces 620. In the illustrated embodiment, the CPU 605 retrieves and executes programming instructions stored in Memory 610, as well as stores and retrieves application data residing in Storage 615. The CPU 605 is generally representative of a single CPU and/or GPU, multiple CPUs and/or GPUs, a single CPU and/or GPU having multiple processing cores, and the like. The Memory 610 is generally included to be representative of a random access memory. Storage 615 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O Devices 635 (such as keyboards, monitors, etc.) are connected via the I/O Interface(s) 620. Further, via the Network Interface 625, the Computing Device 600 can be communicatively coupled with one or more other devices and components (e.g., via a network, which may include the Internet, local network(s), and the like). As illustrated, the CPU 605, Memory 610, Storage 615, Network Interface(s) 625, and I/O Interface(s) 620 are communicatively coupled by one or more Buses 630.

In the illustrated embodiment, the Storage 615 includes a set of one or more Topology Graphs 650. Although depicted as residing in Storage 615, in embodiments, the Topology Graphs 650 may reside in any suitable location. In an embodiment, each Topology Graph 650 is an undirected graph where each node corresponds to a node in a network and each edge corresponds to a communications link in the network. In some embodiments, each Topology Graph 650 is associated with a particular time (e.g., indicated by a timestamp), where each Topology Graph 650 acts as a snapshot of the network at that point in time. That is, each Topology Graph 650 may be generated based on one or more LTMs that were transmitted at a particular time, and the Topology Graph 650 can act as a snapshot of the network at that particular time.

In the illustrated embodiment, the Memory 610 includes a Management Component 105. Although depicted as software residing in Memory 610, in embodiments, the functionality of the Management Component 105 may be implemented using software, hardware, or a combination of software and hardware. As discussed above, the Management Component 105 generally initiates traces based on various criteria, and generates Topology Graphs 650 based on these traces. In an embodiment, the Management Component 105 can automatically identify and remediate network connectivity issues based on these Topology Graphs 650, as discussed above.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   transmitting, from a source end point to a destination end point, a first link trace message at a first point in time;
   generating a first topology graph for a network based on the first link trace message, wherein the first topology graph is associated with a first timestamp based on the first point in time;
   detecting a presence of a connectivity issue in the network;
   transmitting, from the source end point to the destination end point, a second link trace message at a second point in time;
   automatically generating a second topology graph for the network based on the second link trace message, wherein the second topology graph is associated with a second timestamp based on the second point in time; and
   automatically identifying a component in the network that caused the connectivity issue based on comparing the first and second topology graphs to identify one or more differences between the first and second topology graphs.

2. The method of claim 1, wherein the connectivity issue corresponds to a loop in the network and the identified component corresponds to an identified edge, the method further comprising:
   generating an alert indicating that the identified edge caused the loop; and
   automatically remediating the loop by removing the identified edge.

3. The method of claim 1, wherein detecting presence of the connectivity issue comprises:
   transmitting, from the source end point, a connectivity packet to evaluate connectivity in the network; and
   receiving, at the source end point, the connectivity packet.

4. The method of claim 1, the method further comprising:
   transmitting, from the source end point, a connectivity packet to evaluate connectivity in the network;
   upon determining, based on the connectivity packet, that connectivity to the destination end point is not available, transmitting a third link trace message;
   generating a third topology graph for the network based on the third link trace message; and
   identifying a problematic node in the network based on comparing the second topology graph and the third topology graph.

5. The method of claim 1, wherein transmitting the second link trace message was automatically triggered upon detection of the connectivity issue.

6. The method of claim 1, wherein the transmitting the first link trace message was automatically triggered upon detecting a routing change in the network.

7. The method of claim 1, wherein the transmitting the first link trace message was automatically triggered upon detecting a change in a state of an interface in the network.

8. One or more non-transitory computer-readable storage media collectively containing computer program code that, when executed by operation of one or more computer processors, performs an operation comprising:
   transmitting, from a source end point to a destination end point, a first link trace message at a first point in time;
   generating a first topology graph for a network based on the first link trace message, wherein the first topology graph is associated with a first timestamp based on the first point in time;
   detecting a presence of a connectivity issue in the network;
   transmitting, from the source end point to the destination end point, a second link trace message at a second point in time;
   automatically generating a second topology graph for the network based on the second link trace message, wherein the second topology graph is associated with a second timestamp based on the second point in time; and
   automatically identifying a component in the network that caused the connectivity issue based on comparing the first and second topology graphs to identify one or more differences between the first and second topology graphs.

9. The non-transitory computer-readable storage media of claim 8, wherein the connectivity issue corresponds to a loop in the network and the identified component corresponds to an identified edge, the operation further comprising:
   generating an alert indicating that the identified edge caused the loop; and
   automatically remediating the loop by removing the identified edge.

10. The non-transitory computer-readable storage media of claim 8, wherein detecting presence of the connectivity issue comprises:
    transmitting, from the source end point, a connectivity packet to evaluate connectivity in the network; and
    receiving, at the source end point, the connectivity packet.

11. The non-transitory computer-readable storage media of claim 8, the operation further comprising:
    transmitting, from the source end point, a connectivity packet to evaluate connectivity in the network;
    upon determining, based on the connectivity packet, that connectivity to the destination end point is not available, transmitting a third link trace message;
    generating a third topology graph for the network based on the third link trace message; and
    identifying a problematic node in the network based on comparing the second topology graph and the third topology graph.

12. The non-transitory computer-readable storage media of claim 8, wherein transmitting the second link trace message was automatically triggered upon detection of the connectivity issue.

13. The non-transitory computer-readable storage media of claim 8, wherein the transmitting the first link trace message was automatically triggered upon detecting a routing change in the network.

14. The non-transitory computer-readable storage media of claim 8, wherein the transmitting the first link trace message was automatically triggered upon detecting a change in a state of an interface in the network.

15. A system comprising:
one or more computer processors; and
one or more memories collectively containing one or more programs which when executed by the one or more computer processors performs an operation, the operation comprising:
  transmitting, from a source end point to a destination end point, a first link trace message at a first point in time;
  generating a first topology graph for a network based on the first link trace message, wherein the first topology graph is associated with a first timestamp based on the first point in time;
  detecting a presence of a connectivity issue in the network;
  transmitting, from the source end point to the destination end point, a second link trace message at a second point in time;
  automatically generating a second topology graph for the network based on the second link trace message, wherein the second topology graph is associated with a second timestamp based on the second point in time; and
  automatically identifying a component in the network that caused the connectivity issue based on comparing the first and second topology graphs to identify one or more differences between the first and second topology graphs.

16. The system of claim 15, wherein the connectivity issue corresponds to a loop in the network and the identified component corresponds to an identified edge, the operation further comprising:
  generating an alert indicating that the identified edge caused the loop; and
  automatically remediating the loop by removing the identified edge.

17. The system of claim 15, wherein detecting presence of the connectivity issue comprises:
  transmitting, from the source end point, a connectivity packet to evaluate connectivity in the network; and
  receiving, at the source end point, the connectivity packet.

18. The system of claim 15, the operation further comprising:
  transmitting, from the source end point, a connectivity packet to evaluate connectivity in the network;
  upon determining, based on the connectivity packet, that connectivity to the destination end point is not available, transmitting a third link trace message;
  generating a third topology graph for the network based on the third link trace message; and
  identifying a problematic node in the network based on comparing the second topology graph and the third topology graph.

19. The system of claim 15, wherein transmitting the second link trace message was automatically triggered upon detection of the connectivity issue.

20. The system of claim 15, wherein the transmitting the first link trace message was automatically triggered upon one of: (i) detecting a routing change in the network, or (ii) detecting a change in a state of an interface in the network.

* * * * *

UNITED STATES PATENT AND TRADEMARK OFFICE
CERTIFICATE OF CORRECTION

| | |
|---|---|
| PATENT NO. | : 12,074,757 B2 |
| APPLICATION NO. | : 17/820050 |
| DATED | : August 27, 2024 |
| INVENTOR(S) | : Mankamana P. Mishra et al. |

Page 1 of 1

It is certified that error appears in the above-identified patent and that said Letters Patent is hereby corrected as shown below:

In the Specification

In Column 4, Line 49, delete "(LTE)" and insert -- (LTM) --.

Signed and Sealed this
Third Day of December, 2024

*Katherine Kelly Vidal*

Katherine Kelly Vidal
*Director of the United States Patent and Trademark Office*